United States Patent
Banik et al.

(10) Patent No.: US 10,512,886 B2
(45) Date of Patent: Dec. 24, 2019

(54) GRANULATING AMMONIUM SULFATE

(71) Applicants: THYSSENKRUPP INDUSTRIAL SOLUTIONS AG, Essen (DE); thyssenkrupp AG, Essen (DE)

(72) Inventors: Peter Banik, Waltrop (DE); Jens Mathiak, Castrop-Rauxel (DE)

(73) Assignees: THYSSENKRUPP INDUSTRIAL SOLUTIONS AG, Essen (DE); THYSSENKRUPP AG, Essen (DE)

( * ) Notice: Subject to any disclaimer, the term of this patent is extended or adjusted under 35 U.S.C. 154(b) by 0 days.

(21) Appl. No.: 15/574,686

(22) PCT Filed: May 25, 2016

(86) PCT No.: PCT/EP2016/061810
§ 371 (c)(1),
(2) Date: Nov. 16, 2017

(87) PCT Pub. No.: WO2016/189036
PCT Pub. Date: Dec. 1, 2016

(65) Prior Publication Data
US 2018/0117555 A1  May 3, 2018

(30) Foreign Application Priority Data
May 27, 2015  (DE) .................. 10 2015 108 344

(51) Int. Cl.
| | |
|---|---|
| *B01J 2/16* | (2006.01) |
| *C05C 3/00* | (2006.01) |
| *C05G 3/00* | (2006.01) |
| *B01J 8/24* | (2006.01) |
| *C01C 1/24* | (2006.01) |
| *C01F 7/74* | (2006.01) |

(52) U.S. Cl.
CPC . *B01J 2/16* (2013.01); *B01J 8/24* (2013.01); *C01C 1/24* (2013.01); *C01F 7/746* (2013.01); *C05C 3/00* (2013.01); *C05C 3/005* (2013.01); *C05G 3/0058* (2013.01); *B01J 2219/0036* (2013.01); *B01J 2219/00051* (2013.01); *C01P 2004/60* (2013.01)

(58) Field of Classification Search
None
See application file for complete search history.

(56) References Cited

U.S. PATENT DOCUMENTS

| | | | | |
|---|---|---|---|---|
| 3,362,809 A | * | 1/1968 | Tucker ................. | B01J 2/12 422/209 |
| 3,738,821 A | * | 6/1973 | Barber ................. | C05B 7/00 23/313 FB |
| 3,951,638 A | * | 4/1976 | Bradley ............... | B01J 2/04 71/11 |
| 4,219,589 A | * | 8/1980 | Niks ................... | B01J 2/16 427/213 |
| 4,354,450 A | * | 10/1982 | Nagahama ........... | B01J 2/16 118/303 |
| 4,500,336 A | | 2/1985 | Van Hijfte et al. | |
| 4,589,904 A | | 5/1986 | Harrison | |
| 5,120,345 A | * | 6/1992 | Kayaert ............... | B01J 2/16 71/30 |
| 5,779,945 A | * | 7/1998 | Nijsten ................ | B01J 2/00 23/313 FB |
| 8,974,763 B1 | | 3/2015 | Jain | |
| 2012/0231277 A1 | | 9/2012 | Roos | |

FOREIGN PATENT DOCUMENTS

| | | |
|---|---|---|
| EP | 0289074 A | 11/1988 |
| EP | 0475131 A | 3/1992 |
| GB | 1381480 A | 1/1975 |
| GB | 1515898 A | 6/1978 |
| WO | 8904291 A | 5/1989 |

OTHER PUBLICATIONS

English Translation of International Search Report issued in PCT/EP2016/061810, dated Aug. 11, 2016 (dated Aug. 25, 2016).
"Ammonium Sulphate: Sources and Techniques", Nitrogen, British Sulphur CO, London, GB, No. 192, Jul. 1, 1991 (Jul. 1, 1991), pp. 28-31 and 34-36. [Cited in ISR issued in PCT/EP2016/061810].
Wang et al. "Particuology 11: Granulation by spray coating aqueous solution of ammonium sulfate to produce large spherical granules in a fluidized bed", Department of Chemical Engineering, Tsinghua University, (2013), pp. 483-489.

\* cited by examiner

*Primary Examiner* — Wayne A Langel
(74) *Attorney, Agent, or Firm* — thyssenkrupp North America, Inc.

(57) ABSTRACT

A device for producing granules that include ammonium sulfate may include a mixing device, an atomizing device and a fluidized bed. The mixing device may be utilized to produce a composition comprising ammonium sulfate and aluminum sulfate. The atomizing device may be disposed downstream of the mixing device and may be utilized to atomize the composition produced in the mixing device. The fluidized bed may also be disposed downstream of the mixing device. The fluidized bed may be utilized for producing the granules. Further, with respect to a process for producing granules comprising ammonium sulfate, a step of granulating a composition comprising ammonium sulfate and aluminum sulfate may involve providing ammonium sulfate-containing nuclei, fluidizing the ammonium sulfate-containing nuclei, and atomizing the composition onto the nuclei.

10 Claims, No Drawings

GRANULATING AMMONIUM SULFATE

CROSS REFERENCE TO RELATED APPLICATIONS

This application is a U.S. National Stage Entry of International Patent Application Serial Number PCT/EP2016/061810, filed May 25, 2016, which claims priority to German Patent Application No. DE 10 2015 108 344.2 filed May 27, 2015, the entire contents of both of which are incorporated herein by reference.

FIELD

The present disclosure generally relates to processes and devices for improving the granulation of ammonium sulfate.

BACKGROUND

Ammonium sulfate has a multiplicity of applications. For example, ammonium sulfate is used as fertilizer or fertilizer additive. In this case ammonium sulfate is a source not only of nitrogen, but also of sulfur, which are important plant nutrients. In many soils worldwide, there is a sulfur deficit which can be compensated for at least in part by targeted addition of ammonium sulfate.

Ammonium sulfate can be produced in various ways. For example, ammonium sulfate can be formed by introducing ammonia into sulfuric acid. Industrially, ammonium sulfate is frequently crystallized from solutions which arise as a by-product, for example in coal furnaces or plants for producing caprolactam. In the crystallization of ammonium sulfate, usually square] crystals form which customarily have a diameter from 1 to 2 mm.

Ammonium sulfate is customarily not the sole constituent of a fertilizer; rather, fertilizers comprise combinations of various plant nutrients (such as, e.g., nitrogen, phosphorus, potassium or sulfur). Ammonium sulfate, in use, is therefore frequently mixed with granulated fertilizers in order to produce a balanced fertilizer mixture.

However, crystalline ammonium sulfate has some disadvantages that make incorporation thereof into granulated fertilizer mixtures more difficult. Firstly, the ammonium sulfate particles formed in the crystallization are relatively small, secondly the particles frequently vary greatly in size thereof owing to abrasion and dust formation.

These properties make it difficult to produce physically homogeneous fertilizer mixtures with ammonium sulfate. In the distribution of fertilizer mixtures, however, uniform mixing and grain size distribution of the individual constituents is essential. An excessively broad grain size distribution can, in addition, also lead to mechanical problems in the uniform discharge of the fertilizer mixture.

For these reasons, more and more frequently, granulated fertilizers or fertilizer mixtures are used which, in addition, can be provided only shortly before use by mixing the individual constituents. Granulated ammonium sulfate is ideally spherical, and the individual granule particles have a diameter, for example, from 2 to 4 mm. This size is based on urea granules, which is the most widespread fertilizer worldwide.

For production of granulated ammonium sulfate, various processes are known in the prior art.

U.S. Pat. No. 4,589,904 describes the granulation of ammonium sulfate in a drum granulation with downstream dryer, wherein the solution is produced in a preneutralizer.

US 2012/0231277 relates to the production of built-up granules by fluidized-bed or spouted-bed granulation. For this purpose, granulation nuclei, which have been produced in advance separately, are sprayed with an ammonium sulfate-containing solution and then dried.

A problem in the granulation of ammonium sulfate is the formation of dust, whereby particles having a diameter of less than 0.5 mm are understood. The formation of dust is substantially due to three sources. First, the nozzles that atomize the material that is to be granulated generate in each case droplets having a certain distribution of diameters, wherein some of the finest droplets solidify before they impact the ammonium sulfate particles, in such a manner that the dust thus formed leaves the granulator again together with the exhaust air. In addition, the abrasion of the granules, owing to movements and collisions of the particles, may be mentioned as a dust source, in particular in a fluidized bed, wherein the amount of the dust produced depends significantly on the mechanical properties of the granules. Finally, a third source that may be mentioned is the dust formed from the comminution of excessively large granule particles, which dust, in the processes and plants of the prior art, is customarily transferred directly back into the granulator.

For this reason, granulating additives are frequently used that are intended to reduce this dust formation. The addition of these additives leads to the granule particles, and in particular the surface thereof, remaining plastic, in such a manner that as a consequence of their rolling motions and collisions, predominantly round particles having a smooth surface and good mechanical stability are obtained. The resultant granules therefore have a high compressive strength and impact strength, a low tendency for dust formation due to abrasion, and, furthermore, even in the case of relatively long storage, only a small tendency toward lump formation. Corresponding granulation additives, however, are used not only in fluidized-bed granulation, but also in other processes, such as, for example, spray crystallization or drum granulation.

A variety of processes have been described in the prior art for the avoidance or reduction of dust formation. Wang et al. (Particuology 11 (2013), 483-489) describe the use of calcium carbonate or silicon dioxide as additive in the ammonium sulfate solution that is to be granulated, wherein the respective additive must be used in a relatively large amount in order to obtain a satisfactory granulation result. Since these two additives are virtually insoluble in water and form a suspension, they may only be used as microparticles or nanoparticles, which, in turn, is a considerable cost factor in the procurement thereof. Secondly, excessively coarse particles could damage the pump and block the spray nozzles.

The processes and the devices for granulation of ammonium sulfate are, however, not satisfactory in all respects, and there is a need for improved processes and devices.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by 'at least one' or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

It has surprisingly been found that, using aluminum sulfate as additive that is highly water soluble, ammonium sulfate can be granulated with considerably lower dust formation. At the same time, the particle hardness (compressive strength) increases considerably, even in the case of low use of this additive. A higher product fraction in accordance with specification can be achieved thereby in the granulation of ammonium sulfate, as a result of which the process can be carried out more cost effectively than as described in the prior art.

A first aspect of the invention relates to a process for producing granules comprising ammonium sulfate, wherein the process comprises the following steps:

providing a composition comprising ammonium sulfate and aluminum sulfate; and granulating the composition.

Granules preferably comprise particles which are uniformly shaped and are homogeneously composed, and their nature and physical behavior are known to those skilled in the art. The grains of granules can assume various sizes, wherein the breadth of the grain size distribution is a criterion for the quality of granules. The granules according to the invention preferably have a narrow grain size distribution, wherein the largest and smallest particle diameters preferably differ from each other by at most 10 mm, more preferably at most 8 mm, at most 6 mm, at most 4 mm, at most 3 mm, or at most 2 mm.

In a preferred embodiment, the granules according to the invention have a size in the range from 2 to 5 mm, more preferably in the range from 2 to 4.5 mm, still more preferably in the range from 2 to 4 mm, and most preferably in the range from 2.5 to 4 mm.

In step (a) of the process according to the invention, a composition comprising ammonium sulfate and aluminum sulfate is produced. Preferably, the composition additionally comprises water. Preferably, ammonium sulfate, aluminum sulfate and water are mixed with one another in a mixing device. Preferably, a composition of ammonium sulfate and water and also a second composition of aluminum sulfate and water are employed which are mixed together in the liquid state in an appropriate ratio.

Preferably, a composition of crystalline ammonium sulfate and water, and also a second composition of crystalline aluminum sulfate and water are produced which are mixed together in the liquid state in an appropriate ratio. Preferably, a composition of crystalline ammonium sulfate and water are produced, and also a second composition of aluminum sulfate and water are employed which are mixed together in the liquid state in an appropriate ratio. Preferably, a composition of ammonium sulfate and water are employed, and also a second composition of aluminum sulfate and water are produced which are mixed together/metered in the liquid state in an appropriate proportion. Preferably, a composition of ammonium sulfate and water is employed, into which crystalline aluminum sulfate is added in a corresponding ratio. Preferably, a composition of ammonium sulfate and water is produced into which crystalline aluminum sulfate is added in a corresponding ratio. Suitable mixing devices are known to those skilled in the art.

Aluminum sulfate exists not only as a pure compound without water of crystallization, but also with various fractions of water of crystallization. In all preferred embodiments which are described hereinafter, for the fractions and concentrations of aluminum sulfate, the water of crystallization which occurs in the commercially conventional crystalline product (generally stoichiometrically 42.4% by weight) ought to be left out of consideration.

In a preferred embodiment, the content of ammonium sulfate in the composition is in the range from 30% by weight to a maximum for the saturated solution at about 50% by weight, more preferably in the range from 31 to 49% by weight, in the range from 32 to 48% by weight, in the range from 33 to 47% by weight, in the range from 34 to 46% by weight or in the range from 35 to 45% by weight, in each case based on the total mass of the composition, always below the temperature-dependent crystallization limit.

In a preferred embodiment, the content of pure aluminum sulfate in the solids fractions of the composition is in the range from 0.5 to 2.5% by weight, more preferably in the range from 0.55 to 2.3% by weight, in the range from 0.6 to 2.1% by weight, in the range from 0.65 to 1.9% by weight, in the range from 0.7 to 1.7% by weight, in the range from 0.75 to 1.5% by weight, in the range from 0.8 to 1.3% by weight, in the range from 0.85 to 1.2% by weight, or in the range from 0.9 to 1.1% by weight, in each case based on the total mass of the dry granulated product.

In another preferred embodiment, the content of pure aluminum sulfate in the composition is at most 2.5% by weight, more preferably at most 2.3% by weight, at most 2.1% by weight, at most 1.9% by weight, at most 1.7% by weight, at most 1.5% by weight, at most 1.3% by weight, at most 1.2% by weight, at most 1.1% by weight, or at most 1.0% by weight, in each case based on the total mass of the dry granulated product.

Preferably, the mass ratio of ammonium sulfate to aluminum sulfate in the composition is in the range from 50:1 to 10:1, more preferably in the range from 48:1 to 15:1, in the range from 46:1 to 20:1, in the range from 44:1 to 25:1, in the range from 43:1 to 30:1, or in the range from 42:1 to 35:1.

The composition is preferably in the form of a mixture, wherein the mixture can preferably be in the form of a solution.

In step (b) of the process according to the invention, the composition is granulated. The composition can be granulated by customary methods known to those skilled in the art, for example by means of spray crystallization (prilling) or fluidized bed granulation. Preferably, the composition is granulated by fluidized bed granulation.

The granules are produced preferably by drying the solidifying droplets of the composition, or else may be produced by abrasion of granule particles already present that are already solidified. Owing to the wetting of such granule particles with further droplets, the particles grow and preferably form homogeneous granules.

In a preferred embodiment, granulation of the composition provided in step (a) proceeds in step (b) by means of fluidized bed granulation, comprising the steps:

($b_1$) providing ammonium sulfate-containing nuclei;
($b_2$) fluidizing the ammonium sulfate-containing nuclei; and
($b_3$) atomizing the composition provided in step (a) onto the nuclei.

In step ($b_1$) of the process according to the invention, preferably ammonium sulfate-containing nuclei are provided. Preferably, the nuclei are generated by sieving and/or crushing granulated ammonium sulfate.

The nuclei according to the invention preferably have a narrow size distribution, wherein the largest and smallest nucleus diameters preferably deviate at most 4 mm from one another, more preferably at most 2 mm, at most 1 mm, or at most 0.5 mm. Processes for determining a nucleus diameter are known to those skilled in the art.

In a preferred embodiment, the diameter of the ammonium sulfate-containing nuclei is in the range from 0.1 to 4.0 mm, more preferably in the range from 0.1 to 2.0 mm, and most preferably in the range from 0.5 to 2.0 mm.

The ammonium sulfate-containing nuclei are preferably fluidized in a fluidized bed. A fluidized bed is suitable for a multiplicity of engineering processes for treating solids and liquids, and its structure is known to those skilled in the art. The fluidized bed according to the invention is preferably formed by the ammonium sulfate-containing nuclei. Preferably, a fluid flows through the fluidized bed. The ammonium sulfate-containing nuclei are preferably put in a fluidized state by an upwardly-directed flow of the fluid. In this case, a liquid-like state of the nuclei is generated, which is also termed "fluidized bed". Preferably, the fluid comprises air.

Preferably, what is termed the superficial velocity of the fluid, which is used for fluidizing the ammonium sulfate-containing nuclei, is in the range of 1-5 m/s, more preferably in the range of 1.5-4.5 m/s, in the range of 2-4 m/s or in the range of 2.5-3.5 m/s.

Preferably, the temperature of the fluidized bed is in the range from 50° C. to 100° C., more preferably in the range from 60° C. to 90° C., or in the range from 70° C. to 80° C. The fluid is correspondingly preheated in order to establish the fluidized bed temperature.

In step ($b_3$) of the process according to the invention, the composition provided in step (a) is preferably atomized onto the nuclei. The droplets formed on atomizing the composition provided in step (a) are preferably transferred in this case into the fluidized bed of fluidized ammonium sulfate-containing nuclei. On reaching the fluidized bed, the fluid, preferably air, flows around the droplets from bottom to top, wherein the fluid acts in such a manner that the droplets dry and solidify predominantly on the nuclei, as a result of which they contribute to growth of the nuclei.

The composition provided in step (a) is preferably atomized below or within the fluidized bed, in such a manner that the droplets formed on atomizing are atomized into the fluidized bed from bottom to top, as a result of which the atomized composition is transferred onto the particles in the fluidized bed and dried.

In a preferred embodiment, the composition provided in step (a) is atomized in step ($b_3$) via nozzles, wherein at least 150 ml of the composition are atomized via each nozzle per minute, more preferably at least 250 ml per minute, at least 500 ml per minute, at least 1000 ml per minute, at least 1500 ml per minute, or at least 2000 ml per minute.

Preferably, air is used in step ($b_3$) for atomizing the composition provided in step (a). Preferably, a slight reduced pressure prevails in the fluidized bed. Preferably, the reduced pressure is at most 10 mbar, more preferably at most 5 mbar, or at most 2 mbar. Preferably, the reduced pressure ensures that as little as possible dust leaves the fluidized bed, preferably none at all.

Preferably, the flow rate of the air which is used in step ($b_3$) for atomizing the composition via each nozzle is in the range from 10 to 200 $m^3$ per hour, more preferably in the range from 20 to 180 $m^3$ per hour, in the range from 40 to 160 $m^3$ per hour, in the range from 60 to 140 $m^3$ per hour, or in the range from 80 to 120 $m^3$ per hour.

Preferably, the droplets wet the ammonium sulfate-containing nuclei or the already present previously solidified granule particles in such a manner that they grow uniformly and form homogeneous granules.

In a preferred embodiment, the granule particles leave the fluidized bed and are preferably transferred to a sorting device. Suitable measures for transferring granule particles from a fluidized bed to a further device are known to those skilled in the art. For example, by using specially constructed distributor plates, the granule particles in the fluidized state can be set not only into vertical motion, but additionally also into horizontal motion, and thus gradually leave the fluidized bed.

In a preferred embodiment, at least a part of the air used for fluidizing in step ($b_2$) is purified in a purification stage. Preferably, the air, after it flows through the fluidized bed, is removed from above the fluidized bed and fed to the purification stage. Preferably, the air is purified in the purification stage, i.e. in particular is freed from solid particles and droplets. Preferably, the purification stage is a wet scrubber.

In a preferred embodiment, the granules are divided into three fractions after their production, wherein one fraction ($F_1$) contains particles having the desired target size, one fraction ($F_2$) contains particles having a size above the desired target size, and one fraction ($F_3$) contains particles having a size below the desired target size.

Preferably, the fraction ($F_1$) which contains particles having the desired target size is processed further after it leaves the fluidized bed.

Preferably, the fraction ($F_2$) which contains particles having a size above the desired target size is fed to a comminution device, which is preferably configured to comminute granule particles. Preferably, the particles of the fraction ($F_2$) are comminuted in the comminution device and the comminuted particles are preferably fed back to the fluidized bed.

Preferably, the fraction ($F_3$) which contains particles with a size below the desired target size is fed back to the fluidized bed.

In a preferred embodiment, the finished granules comprise at least 95% by weight of the amount of ammonium sulfate and aluminum sulfate atomized in step ($b_3$), more preferably at least 95.5% by weight, at least 96% by weight, more preferably at least 96.5% by weight, at least 97% by weight, at least 97.5% by weight, or at least 98% by weight.

In a preferred embodiment, the amount of ammonium sulfate and aluminum sulfate which do not contribute to the mass of the finished granules and form dust, for example, is at most 5% by weight, more preferably at most 4.5% by weight, at most 4% by weight, at most 3.5% by weight, at most 3% by weight, at most 2.5% by weight, at most 2% by weight, at most 1.5% by weight, at most 1% by weight, or at most 0.5% by weight, in each case based on the dry total mass of atomized ammonium sulfate and aluminum sulfate.

A further aspect of the invention relates to granules which comprise ammonium sulfate and aluminum sulfate, wherein all granule particles have a comparable composition, and wherein the content of pure aluminum sulfate in the granules is in the range from 0.5 to 2.5% by weight.

Comparable composition within the meaning of the invention means that the amounts of substance of the individual components of the granules according to the invention in the individual granule particles differ by at most 2% from the mean value of the amounts of substance of the respective component in the total granules, more preferably at most 1.5%, or at most 1%. Methods for determining the amounts of substance of granules are known to those skilled in the art.

In a preferred embodiment, the content of ammonium sulfate in the granules is at least 97.5% by weight, more preferably at least 98% by weight, at least 98.5% by weight, or at least 99% by weight, in each case based on the total mass of the granules.

In a further preferred embodiment, the content of pure aluminum sulfate in the granules is in the range from 0.5 to 2.5% by weight, more preferably in the range from 0.6 to 2% by weight, in the range from 0.7 to 1.5% by weight, or in the range from 0.8 to 1.0% by weight, in each case based on the total mass of the granules.

The granules can optionally comprise further constituents. For example, the particulate composition comprises water as residual moisture. Preferably, the content of water in the granules is at most 1.0% by weight, more preferably at most 0.8% by weight, at most 0.6% by weight, at most 0.4% by weight, or at most 0.2% by weight, in each case based on the total mass of the granules.

A further aspect of the invention relates to a device for producing granules comprising ammonium sulfate, wherein the device comprises the components that are in effective connection with one another at least at times:

a mixing device, configured for producing a composition comprising ammonium sulfate and aluminum sulfate;

an atomizing device, arranged downstream of the mixing device, configured for atomizing the composition produced in the mixing device; and a fluidized bed, arranged downstream of the mixing device, configured for producing the granules.

All preferred embodiments which are described above in connection with the process according to the invention apply correspondingly analogously also to the device according to the invention.

The components of the device according to the invention are in effective connection with one another, i.e. are connected by suitable piping etc. to one another in a manner which ensures the general functionality of the device. The measures necessary therefor are known to those skilled in the art.

The mixing device according to the invention is preferably configured for producing a composition comprising ammonium sulfate and aluminum sulfate. The structure and mode of functioning of such a mixing device are known to those skilled in the art.

In the atomizing device, the composition which is produced in the mixing device according to the invention is preferably atomized. Preferably, the atomizing device is arranged upstream, preferably below or within, the fluidized bed, and atomizes the composition from bottom to top onto the fluidized bed. The atomizing device is configured in such a manner that the droplets formed on atomizing have a narrow size distribution and are distributed uniformly.

The fluidized bed is preferably configured to fluidize the ammonium sulfate nuclei and the granule particles forming.

In a preferred embodiment, the device comprises the components additionally in effective connection with the device:
(D) a dividing device, arranged downstream of the fluidized bed, configured for dividing the granules into fractions of differing particle sizes; and/or
(E) a purification stage, configured for purifying the air used for the fluidizing.

The dividing device is preferably arranged downstream of the fluidized bed and is configured for dividing the granules into fractions of differing particle size. In this case those particles that have the desired target size are preferably further processed after they leave the fluidized bed. Particles having a size above the desired target size, optionally also a small part of the product stream, are preferably fed to a comminution device and there comminuted. Preferably, the comminuted particles are fed back to the fluidized bed as nuclei. Particles having a size below the desired target size are fed back to the fluidized bed as nuclei.

The purification stage is preferably configured to purify the air which has flowed through the fluidized bed, i.e. in particular to free it from solid particles and droplets. Preferably, the purification stage is a wet scrubber.

In a preferred embodiment, the device according to the invention is used in the process according to the invention.

What is claimed is:

1. A process for producing granules comprising ammonium sulfate, the process comprising:
   providing a composition comprising ammonium sulfate and aluminum sulfate; and
   granulating the composition;
   wherein a content of ammonium sulfate in the composition is between 30% by weight to a maximum for a saturated solution;
   wherein the granulation of the composition is performed by way of fluidized bed granulation comprising:
   providing ammonium sulfate-containing nuclei;
   fluidizing the ammonium sulfate-containing nuclei; and
   atomizing the composition onto the nuclei,
   wherein the composition is atomized onto the nuclei via nozzles, wherein at least 150 ml of the composition is atomized per minute via each of the nozzles.

2. The process of claim 1 wherein a content of ammonium sulfate in the composition is between 30% and 50% by weight.

3. The process of claim 1 wherein a content of aluminum sulfate in the composition is between 0.5% and 2.5% by weight based on a total mass of a dry granulated product.

4. The process of claim 1 wherein a temperature in a fluidized bed used for the fluidized bed granulation is in a range from 50° C. to 100° C.

5. The process of claim 1 wherein a diameter of the ammonium sulfate-containing nuclei is in a range from 0.5 to 2.0 mm.

6. The process of claim 1 wherein the granules comprise at least 95% by weight of an amount of ammonium sulfate and aluminum sulfate that has been atomized.

7. The process of claim 1 wherein the granules have a size in a range from 2 to 5 mm.

8. The process of claim 1 wherein the composition is a solution.

9. The process of claim 1 further comprising dividing the granules into three fractions after the granules are produced, wherein a first fraction of the three fractions contains particles having a desired target size, a second fraction of the three fractions contains particles having sizes above the desired target size, and a third fraction of the three fractions contains particles having sizes below the desired target size.

10. Granules that comprise ammonium sulfate and aluminum sulfate, wherein the granules have a comparable composition, wherein a content of the aluminum sulfate in the granules is in a range from 0.5 to 2.5% by weight, wherein the granules are prepared according to the process of claim 1.

* * * * *